United States Patent
Chen

(10) Patent No.: US 8,812,316 B1
(45) Date of Patent: Aug. 19, 2014

(54) SPEECH RECOGNITION REPAIR USING CONTEXTUAL INFORMATION

(71) Applicant: Apple Inc., Cupertino, CA (US)

(72) Inventor: Lik Harry Chen, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/297,473

(22) Filed: Jun. 5, 2014

Related U.S. Application Data

(63) Continuation of application No. 13/247,912, filed on Sep. 28, 2011, now Pat. No. 8,762,156.

(51) Int. Cl.
| | |
|---|---|
| *G10L 15/26* | (2006.01) |
| *G06F 17/21* | (2006.01) |
| *G06F 17/27* | (2006.01) |
| *G10L 15/06* | (2013.01) |
| *G10L 17/00* | (2013.01) |
| *G10L 15/04* | (2013.01) |
| *G10L 13/00* | (2006.01) |
| *G10L 21/00* | (2013.01) |

(52) U.S. Cl.
CPC .................................. *G10L 15/26* (2013.01)
USPC ............... 704/235; 704/9; 704/10; 704/245; 704/246; 704/251; 704/265; 704/270; 704/270.1; 704/275

(58) Field of Classification Search
CPC ..... G10L 15/10; G10L 15/22; G10L 15/1815; G10L 15/1822; G10L 15/183; G10L 15/19; G10L 15/193; G10L 15/197; G10L 17/10; G10L 17/12
USPC ............... 704/9, 10, 235, 245, 246, 251, 265, 704/270, 270.1, 275
See application file for complete search history.

(56) References Cited

U.S. PATENT DOCUMENTS

| | | | | |
|---|---|---|---|---|
| 5,909,666 | A * | 6/1999 | Gould et al. | 704/251 |
| 5,915,236 | A * | 6/1999 | Gould et al. | 704/251 |
| 5,920,836 | A * | 7/1999 | Gould et al. | 704/251 |
| 5,920,837 | A * | 7/1999 | Gould et al. | 704/251 |
| 5,960,394 | A * | 9/1999 | Gould et al. | 704/270.1 |
| 5,983,179 | A * | 11/1999 | Gould | 704/270.1 |
| 6,064,959 | A * | 5/2000 | Young et al. | 704/251 |
| 6,073,097 | A * | 6/2000 | Gould et al. | 704/251 |
| 6,092,043 | A * | 7/2000 | Squires et al. | 704/251 |
| 6,101,468 | A * | 8/2000 | Gould et al. | 704/251 |
| 6,839,669 | B1 * | 1/2005 | Gould et al. | 704/246 |
| 6,912,498 | B2 * | 6/2005 | Stevens et al. | 704/235 |
| 7,315,818 | B2 * | 1/2008 | Stevens et al. | 704/235 |
| 7,426,468 | B2 * | 9/2008 | Coifman et al. | 704/275 |
| 7,620,549 | B2 * | 11/2009 | Di Cristo et al. | 704/257 |
| 7,805,299 | B2 * | 9/2010 | Coifman | 704/235 |
| 7,809,565 | B2 * | 10/2010 | Coifman | 704/252 |
| 7,949,529 | B2 * | 5/2011 | Weider et al. | 704/270 |

(Continued)

*Primary Examiner* — Edgar Guerra-Erazo
(74) *Attorney, Agent, or Firm* — Morrison & Foerster LLP

(57) ABSTRACT

A speech control system that can recognize a spoken command and associated words (such as "call mom at home") and can cause a selected application (such as a telephone dialer) to execute the command to cause a data processing system, such as a smartphone, to perform an operation based on the command (such as look up mom's phone number at home and dial it to establish a telephone call). The speech control system can use a set of interpreters to repair recognized text from a speech recognition system, and results from the set can be merged into a final repaired transcription which is provided to the selected application.

20 Claims, 11 Drawing Sheets

(56) References Cited

U.S. PATENT DOCUMENTS

| | | | |
|---|---|---|---|
| 8,055,502 B2 * | 11/2011 | Clark et al. | 704/270 |
| 8,296,145 B2 * | 10/2012 | Clark et al. | 704/270 |
| 8,332,224 B2 * | 12/2012 | Di Cristo et al. | 704/257 |
| 8,620,659 B2 * | 12/2013 | Di Cristo et al. | 704/257 |
| 2002/0138265 A1 * | 9/2002 | Stevens et al. | 704/251 |
| 2004/0254791 A1 * | 12/2004 | Coifman et al. | 704/246 |
| 2005/0086059 A1 * | 4/2005 | Bennett | 704/270 |
| 2005/0192801 A1 * | 9/2005 | Lewis et al. | 704/240 |
| 2006/0293886 A1 * | 12/2006 | Odell et al. | 704/231 |
| 2007/0038436 A1 * | 2/2007 | Cristo et al. | 704/9 |
| 2007/0198269 A1 * | 8/2007 | Braho et al. | 704/270 |
| 2007/0276651 A1 * | 11/2007 | Bliss et al. | 704/9 |
| 2008/0126100 A1 * | 5/2008 | Grost et al. | 704/275 |

* cited by examiner

SPEECH RECOGNITION REPAIR USING CONTEXTUAL INFORMATION

CROSS-REFERENCE TO RELATED APPLICATIONS

This application is a continuation of U.S. application Ser. No. 13/247,912, filed on Sep. 28, 2011, entitled SPEECH RECOGNITION REPAIR USING CONTEXTUAL INFORMATION, which is hereby incorporated by reference in its entirety for all purposes.

BACKGROUND OF THE INVENTION

The present invention relates to speech recognition systems, and in one embodiment speech recognition systems which are used to control a data processing system.

A common problem with many speech recognition systems is accuracy. A user can speak to a speech recognizer and the system can respond with recognized text, but the recognized text can often contain many errors because the speech recognizer did not properly recognize the human user's words.

Speech recognition can be used to invoke voice dialing on a telephone, such as when a user speaks the command "call mom" on the telephone. The use of speech to control a data processing system can result in abnormal system behavior when a transcription error from the speech recognizer system decides that the user spoke "call Tom" instead of "call mom." Transcription errors may be caused by a hardware deficiency, such as the inability to capture high quality audio recording via a Bluetooth headset or user error such as incorrect or incomplete pronunciation or background noise. Some speech recognition systems can employ the use of context to improve the speech recognition system; U.S. Pat. No. 7,478,037 provides an example of a speech recognition system which employs context to aid in the speech recognition process.

SUMMARY OF THE DESCRIPTION

An embodiment of the invention provides a speech control system that can recognize a spoken command and associated words (such as "call mom at home") and can cause a selected application (such as a phone dialer) to execute the command to cause the system (which can be a smartphone) to perform an operation based on the command and associated words (such as, place a phone call to mom at home.) The speech control system can, in one embodiment, use a speech recognizer that includes a conventional acoustic model and a conventional language model to generate a text output from a digitized input obtained from a human user's speech. The speech control system can, in one embodiment, be launched by a speech assistant application that the user can invoke, and this speech assistant application can interpret and repair the text output from the speech recognizer and provide a repaired text output to a selected application in a set of applications; the set of applications can include, for example, one or more applications such as a telephone application (to dial and establish a voice telephone call connection) and a media player application (e.g. iTunes) and an SMS (Short Message Service) "text message" application and video conferencing (e.g. "FaceTime") or chat applications and an application to find or locate individuals such as friends and other applications.

The speech assistant application, in one embodiment, interprets the text output using a set of interpreters, each of which are designed to interpret a specific type of text that the set of applications use. For example, a first name interpreter is designed to interpret first names (in a first name field) in an address book or contacts database, a last name interpreter is designed to interpret last names (in a last name field) in the address book or contacts database, a full name interpreter is designed to interpret full names in the address book or contacts database, and a business name interpreter is designed to interpret business names in the address book or contacts database. These interpreters can, in one embodiment, be configured to use different algorithms or processes to interpret each word in the text output; for example, a full name interpreter can use a fuzzy matching (with edit distance similarity measurements) algorithm to compare a word in the text output to words in the address book or contacts database but does not, in one embodiment, use an n-gram algorithm to compare a word in the text output to words in the address book or contacts database, while a first name interpreter uses the n-gram algorithm to compare a word in the text output to words in the address book or contacts database. Moreover, these interpreters can, in one embodiment, use different searching algorithms when searching, for matches, through the address book or contacts database. Each interpreter can, in one embodiment, also use the context (e.g. the context can include an indication that a media player is playing a song) when interpreting a word. The context can include, in one embodiment, a history of user inputs such as a conversation history (e.g. prior recognized speech) or a status of applications in the set of applications, etc. Each interpreter in the set can, in one embodiment, process each word in the text output to attempt to determine if it can repair the word, and each interpreter, in one embodiment, decides, on its own, whether it can repair each word; the interpreter produces a score or confidence level that indicates whether it can repair the word.

A controller of the set of interpreters can, in one embodiment, process the results of the set of interpreters by ranking the resulting repaired interpretations, using each interpreter's score or confidence level to perform the ranking and then merging the ranked interpretations. The merging seeks, in one embodiment, to avoid an overlap in interpretations so that only an output from one interpreter is used to repair a particular word.

In one embodiment, the speech assistant application can determine a command in the text output from the speech recognizer system based on a position of a word in a string of words or by using a grammar parser to determine the command, and that command, along with a repaired speech transcription, can be passed, by the speech assistant application, to a particular application in a set of applications for the particular application to execute the command using the repaired speech transcription. In this embodiment, the speech assistant application can select the particular application based on the command; for example, a "call" command in the recognized text causes the speech assistant application to pass, through an API, the "call" command along with the repaired speech transcription to a telephone dialer or telephone application while a "stop" command in the recognized text causes the speech assistant application to pass, through the API, the "stop" command to a media player (such as iTunes) to stop playing the currently playing song. In this example, the context provided to a media player interpreter in the set of interpreters can include the status of media (e.g., the context includes the status that the Beatles song "Come Together" is currently playing at the time that the speech input containing the recognized word "stop" was received by the speech recognizer system). In this example, a user does not need to select a particular desired application before speaking a command; rather, the user speaks with the speech assistant application being the front most application (and having the speech input focus) and the speech assistant application then automatically (without the user specifying directly the application) selects the proper application, in the set of applications, based on the command, and then passes the command, through an API, to the selected application.

The embodiments described herein can be implemented as machine readable non-transitory storage media or as methods or as data processing systems.

The above summary does not include an exhaustive list of all aspects of the present invention. It is contemplated that the invention includes all systems and methods that can be practiced from all suitable combinations of the various aspects summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
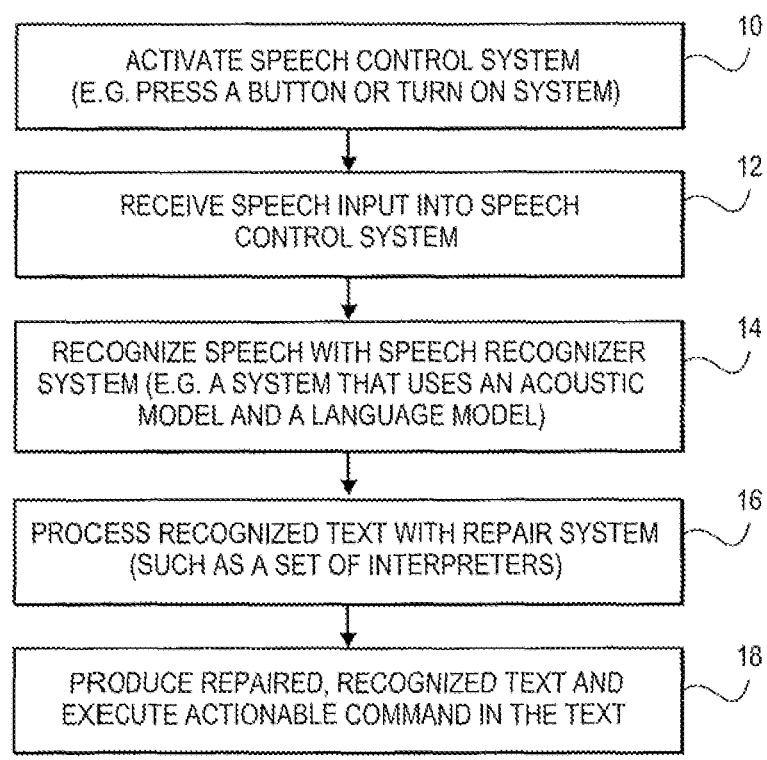
FIG. 1 shows a flowchart which illustrates a method according to one embodiment of the present invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

One embodiment of the present invention provides a set of interpreters, each of which are designed or configured to repair errors of a particular type in recognized text provided by the speech recognizer system. The speech recognizer system can be a conventional software based speech recognition system which includes both an acoustic model and a language model, and the combination of these models in the speech recognizer system produces a text output which is then repaired by the set of interpreters. The interpreters can be configured to operate with particular databases and content in the databases as well as particular applications which can use those databases. In one embodiment, the separation of the set of interpreters from the speech recognizing system (such that the set of interpreters operate after the speech recognition system provides an output), allows greater flexibility in designing a speech control system. Any changes in the particular applications and/or those databases can be reflected in changes in the appropriate and corresponding interpreters without having to change the underlying speech recognition system. For example, a data processing system can use an off-the-shelf, conventional speech recognition system and then provide tailored interpreters which are tailored for particular applications and particular databases containing content which will appear in spoken commands for each application or a set of applications on a data processing system. For example, a command such as "call John Smith on mobile" uses words which presumably should appear in a user's contact or address book database. The first name John should appear in the database and the last name Smith should appear in the database; moreover, the database should include a field identifier indicating that one of the phone numbers is the mobile phone number for John Smith. The command "call" can be required to be at the beginning of the spoken command or a data processing system can use a grammar parser to determine the position of the command from the spoken command. If the contacts database changes or the phone application changes (e.g. a command is added or deleted or revised), the interpreter for that database and application can be changed without having to revise the speech recognition system (e.g., without having to revise the speech recognition system's language model). The interpreter can be changed by, for example, changing the fields (in a database) that it interacts with or changing the algorithms used to match words in text output (from the speech recognition system) with the fields in the database or by changing the searching algorithms used to search through the database.

FIG. 1 shows an example of a method according to one embodiment of the present invention which can use a set of interpreters to repair a text output which has been provided by a speech recognizer system, such as the system that uses an acoustic model and a language model. The method can begin in operation 10 in which a speech control system is activated. For example, in one embodiment, a user can press a button or press and hold a button or select or launch a speech assistant application or merely turn on a data processing system which invokes a speech assistant application as a background demon which runs at all times. After the speech control system has been activated (for example, the speech assistant application is front most and has the speech input focus), in one embodiment, the user can speak a command such as "call John Smith on mobile" or "tell John Smith that I am in traffic and will be late for the meeting" or "play all songs by the Beatles" or "tell my son to pick up milk if he goes to Safeway after school", etc. Then in operation 14, a conventional speech recognition system or speech recognizer can recognize words received in the spoken input which has been digitized and processed using the conventional speech recognition system which can employ both an acoustic model and a language model to produce a text output which can be in a Unicode or ASCII format or encoding or other character encodings. Conventional speech control or speech recognition systems use the resulting output at this point without further processing. In at least some embodiments of the present invention, the output is processed further in order to determine whether or not to repair one or more words in the recognized text output from the speech recognizer system provided by operation 14. For example, in one embodiment of the present invention, operation 16 is performed by processing the recognized text, which can be in Unicode encoding, to determine whether or not one or more words in the recognized text can be repaired. In one embodiment, the repair is performed by a set of interpreters, where each interpreter is designed or configured to repair a particular type of error such as an error in a particular field of a database's data structure. For example, one interpreter can be configured and designed to repair errors in the first name of a contact database while another interpreter can be designed to repair errors in a business name in a contact database. The manner in which each of the interpreters is configured to repair specific types of error in specific fields, is described further below through the use of different algorithms, including different processing algorithms or searching algorithms. As a result of the processing in operation 16, the repaired text is provided in operation 18 and then can be provided as an actual command to a particular application which can be one application within a set of applications.

In one embodiment, a data processing system may include two applications in the set, such as a telephone dialer which is controlled by speech input and a media player, such as iTunes which is controlled by speech input. In another embodiment, the set of applications can include those applications as well as a text messaging (SMS-short messaging service) application, and an email application, and a calendar application, and a reminder application, and a local search application and a video conferencing application and a person or object locating application. A local search application is one in which a user instructs a data processing system to provide information about a local business or local entity which is geographically close to the user's current position. For example a local search spoken command can be "find a Chinese restaurant" which can invoke a search through a web browser for local Chinese restaurants based upon the user's current location. Alternatively the spoken command could be, in the case of a local search application, "call DNJ Auto Repair". If a contact database in the user's system does not include an entry for DNJ Auto Repair, then the system can in response invoke a web search for the business known as DNJ Auto Repair in an area which is local to the user's current location (such as a location determined by a GPS receiver).

Figure 2:
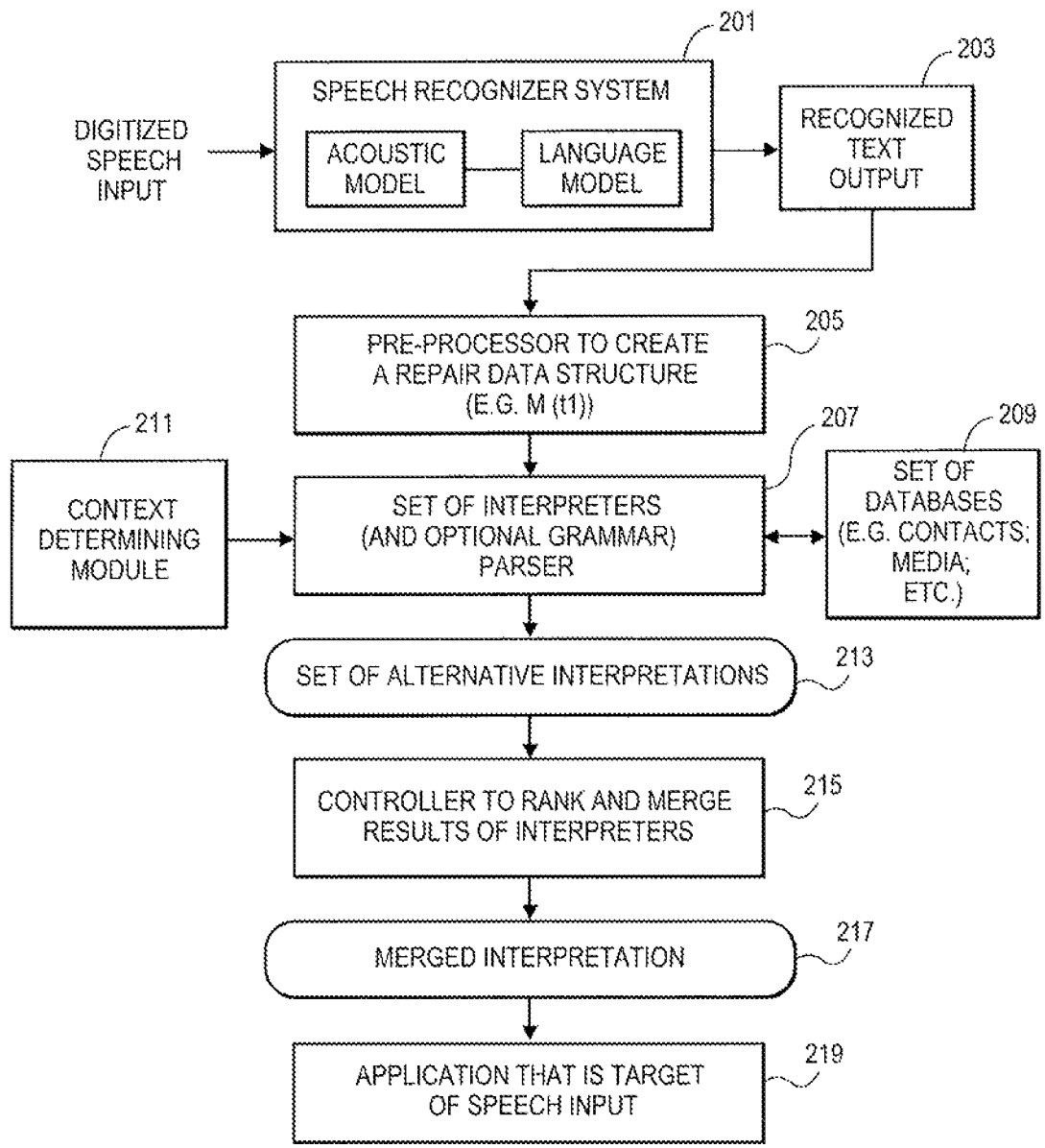
FIG. 2 shows an example of an architecture which can include software modules and data structures according to one embodiment of the present invention.

FIG. 2 shows an example of an architecture of a data processing system which can include a plurality of software modules or hardware subsystems to implement each of the blocks shown in FIG. 2 which also include data structures, such as databases and outputs from the modules. In one embodiment, each of the elements 201, 205, 207, 211, 215, and 219 can be implemented as software modules or software applications which interact through one or more APIs in order to perform the method shown in FIG. 3 or the method shown in FIG. 5A or a combination of the methods shown in FIGS. 3 and 5A. The architecture shown in FIG. 2 can also include a speech assistant application which provides the digitized speech input to a speech recognizer system 201; in one embodiment, the speech assistant application can include the set of interpreters shown as element 207 and the controller shown as element 215, and the speech assistant application can operate as the preprocessor shown as element 205. Further, the speech assistant application can also include the context determining module which is shown as element 211.

Element 201 in FIG. 2 can include a conventional speech recognizer system which employs both an acoustic model and a language model to recognize words in digitized spoken commands or inputs from a human user. In one embodiment, a microphone collects the spoken sounds from the human user and those sounds are digitized and provided to the speech recognizer system shown as element 201 which in turn produces a recognized text output, in a character encoding format such as Unicode, shown as element 203. This text output 203 is then provided to element 205 which can be a preprocessor which creates a repair data structure which can be in one embodiment a parsed data structure using tokens, described further below in conjunction with FIG. 7 which provides an example of such a parsed data structure which is used in the repair process of, for example, the method shown in FIG. 3 or the method shown in FIG. 5A. Tokens, in one embodiment, can be used in the data structure to represent each word in the text output 203, and the set of interpreters in element 207 can operate on those tokens or words in order to determine whether or not to repair each of the words in the text output 203. In one embodiment, an optional grammar parser can be included in element 207 in order to determine which word in the phrase is the command which can be used to select a particular application out of the set of applications as will be described further below in conjunction with FIG. 5A. An example of a set of interpreters which can be used in element 207 is shown in FIG. 4, which includes a set of interpreters which can use different algorithms either for searching their corresponding databases or for processing words to determine whether a match exists between the words in the text output and the words in the corresponding databases.

Figure 4:
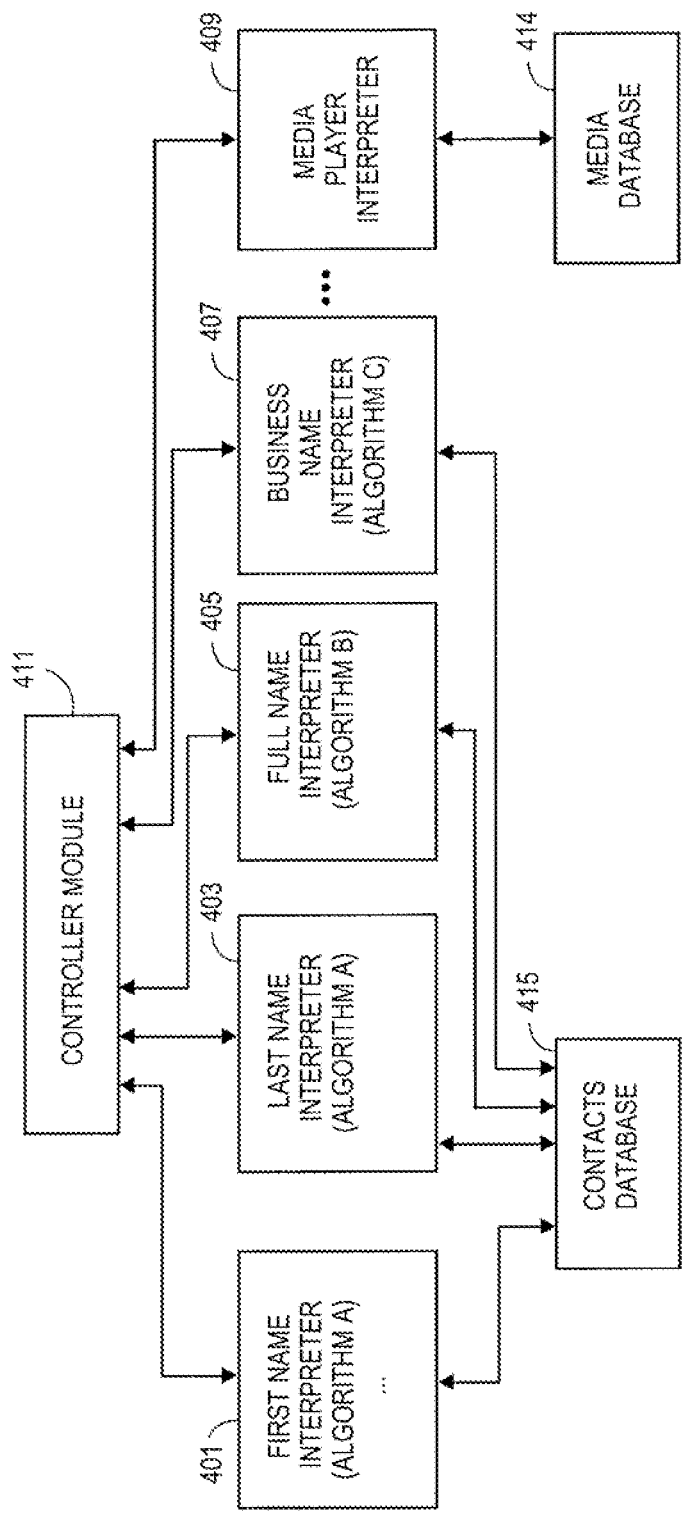
FIG. 4 shows an example of an architecture according to one embodiment of the present invention in which a controller module is used to rank and merge repaired results from a set of interpreters according to one embodiment of the present invention.
Figure 8:
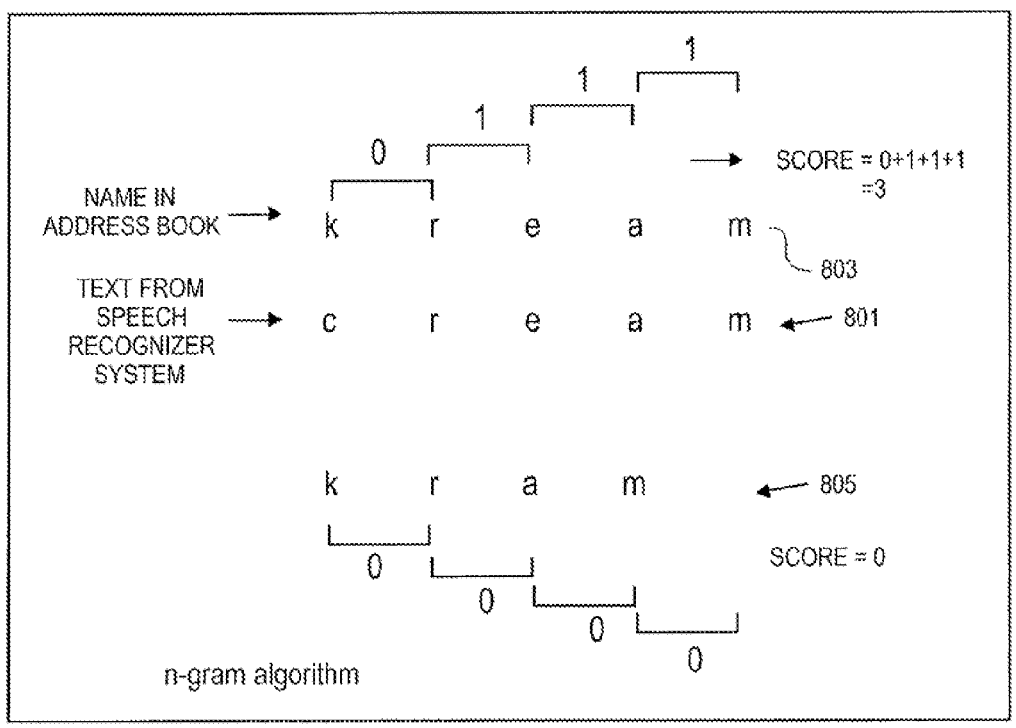
FIG. 8 shows an example of a particular algorithm which can be used by one or more of the interpreters described herein when the interpreter is determining whether or not to repair a particular word that has been recognized by a speech recognition system.

FIG. 8 shows an example of an algorithm which can be used by one or more interpreters in the set of interpreters in order to determine whether a match exists between a word in the text output 203 and a word in one or more databases, such as the contacts database 415 shown in FIG. 4. These various algorithms will be described further below in conjunction with FIGS. 4 and 8. Element 211 can be a context determining module, such as the context determining model 601 shown in FIG. 6. The output from this context determining module in element 211 is provided to one or more of the interpreters in the set of interpreters shown in element 207 in order for those interpreters to use the context when determining whether or not a word in the text output 203 can be repaired by each of the interpreters.

Each of the interpreters can be configured or designed to interact with one or more databases, such as the databases in element 209. These databases can include a contacts or address book database, an email database, a text messaging database, a media database, such as an iTunes database or a database of songs or movies or a combination of songs and movies, etc. Other databases and corresponding interpreters to interact in those databases can also be included in one embodiment of the present invention. In a typical operation, an interpreter designed to interact with a particular database (and not interact with other databases) will process each word other than a command word to determine whether and how much the word matches an existing word in its corresponding database. For example, the first name interpreter can, using an n gram algorithm as shown in FIG. 8, search for matches of a word which might be a first name in a contact database by searching through the database for that word and then determining whether or not a repair should be performed by the use of one or more algorithms designed to determine a level of matching between words in the database and the word currently be processed by the interpreter. In one embodiment, each interpreter processes every word other than the command word in text output 203 to determine whether that interpreter can repair the word. Moreover, each interpreter can provide a score or confidence level which indicates the level of matching or whether the word should be repaired with an alternative word found in the database.

The set of interpreters shown in element 207 can, in one embodiment, provide a set of alternative interpretations, and these alternative interpretations are processed by, in one embodiment, a controller, shown in element 215 which can rank and merge the results of the interpreters in order to provide a merged interpretation 217 which can then be provided to an application which is the target of the command in the speech input.

In one embodiment, the controller in element 215 can be the controller module 411 shown in FIG. 4 which interacts with a set of interpreters shown in FIG. 4, which in turn interact with one or more databases by performing searches through those databases and processing matches in those databases using one or more algorithms as is described further below. The speech assistant application such as speech assistant application 511 shown in FIG. 5B can call, to an API, the target application shown as element 219 and can provide as a parameter of those calls the command and the repaired transcription which is the merged interpretation 217 in one embodiment.

Figure 3:
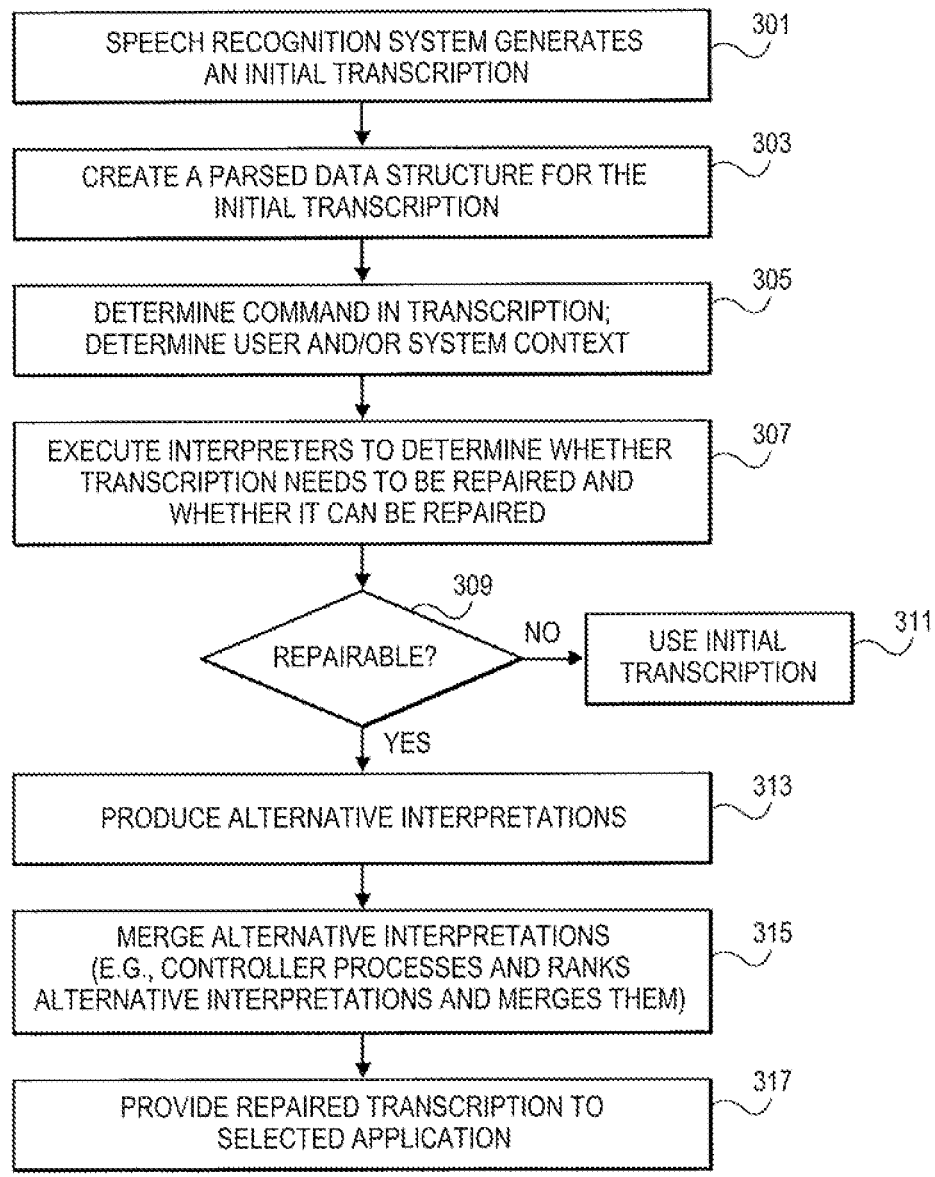
FIG. 3 is a flowchart which shows a method according to one embodiment of the present invention.
Figure 7:
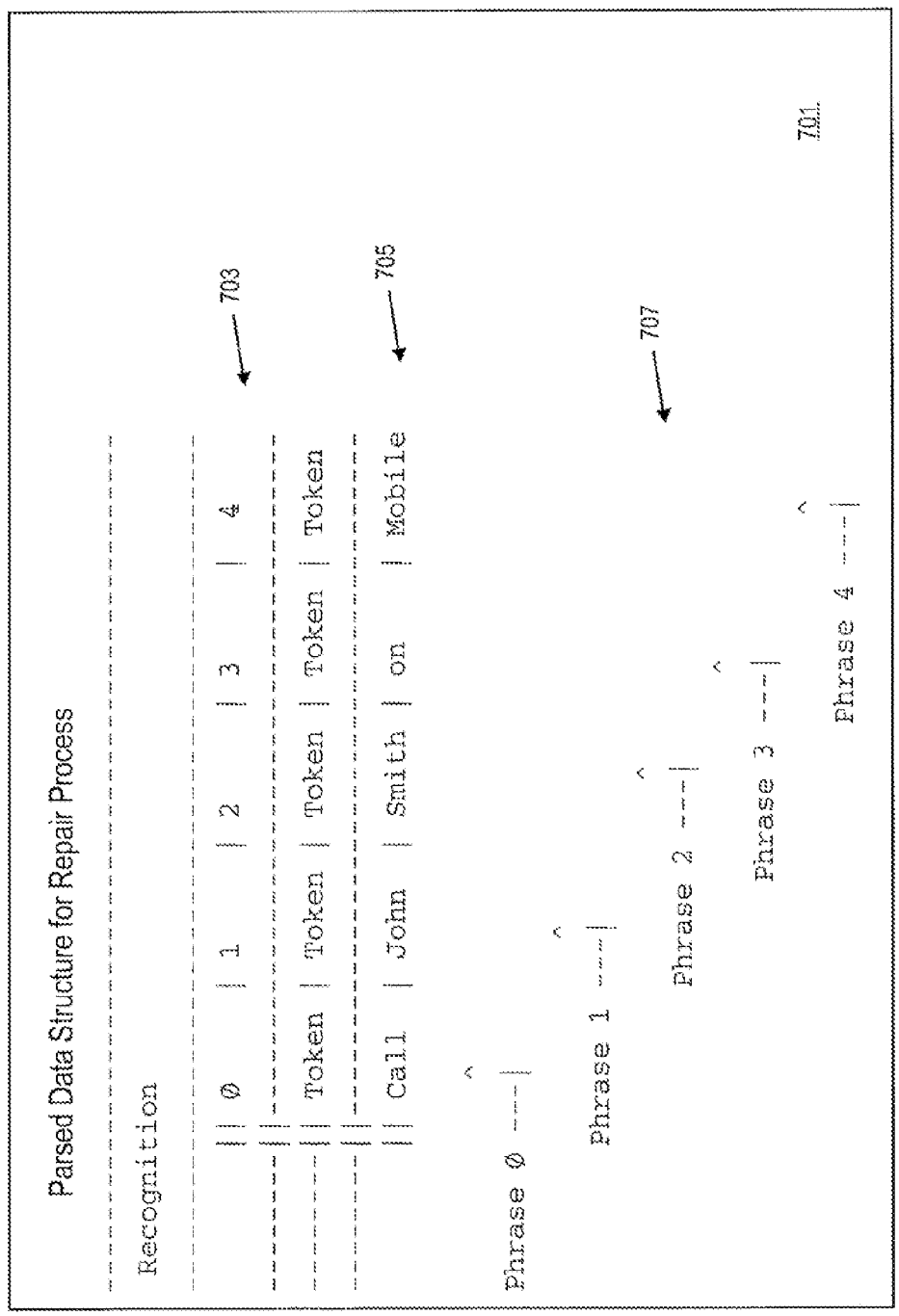
FIG. 7 shows an example of a data structure which can be used in the repair process in one or more embodiments described herein.

A method for repairing words in recognized text output, such as recognized text output 203, is shown in FIG. 3. The method of FIG. 3 can be performed with the architecture shown in FIG. 2 and with the architecture shown in FIG. 4 and use the one or more APIs shown in FIG. 5B. Moreover, the method of FIG. 3 can use a speech assistant application which can select an application out of a set of applications based upon the command which is detected in the recognized text output 203. The method of FIG. 3 can begin in operation 301 in which the speech recognition system generates an initial transcription. This can be the recognized text output 203 shown in FIG. 2. The speech recognition system used in operation 301 can be the speech recognizer system 201 which includes a conventional acoustic model and language model used to recognize words in the digitized speech input. In operation 303, the data processing system which is performing the method of FIG. 3 can create a parsed data structure for the initial transcription. This parsed data structure can be used in the repair process of FIG. 3, and an example of such a data structure is shown in FIG. 7 which will be described further below. In operation 305, the system determines the command in the transcription and also determines the user and/or system context. The command can be determined by requiring the user to speak the command first or by using a grammar parser which parses the text output, such as the text output 203, to determine the location of the command and therefore the command word itself in the text output, such as the text output 203.

In addition, in the embodiment shown in FIG. 3, operation 305 also includes determining the user and/or system context. The context information can include a list of which applications are launched and running and which applications are not launched and running, whether or not a media player is playing media, such as a song or movie, and can also include user state based on sensors, such as proximity sensors, orientation sensors, accelerometers, and other sensors. Further, the context information can also include prior conversation history which can include (for each application in the set of applications) previously recognized text, such as play the Beatles album "Abbey Road", etc. In one embodiment, the context can include application domains that are mentioned in a previous conversation, and can also include whether or not the current application state expects a confirmation from a user such as a yes or a no or a cancel, etc. Choice values (for a confirmation) can be specified by the system based upon the current conversation context. For example, the user asks the system to send an email to a friend. After composing the message, the system requests the user to confirm. At this point, the confirmation choice values are populated with "yes", "cancel", and "change it". The context information can also include, in one embodiment, the current location of the user, such as the current GPS location which can be used if the user requests a local search as described herein. The context information can also include a locale context and/or a language context; for example, an input language context can be used by the set of interpreters to assist in speech repair. In one embodiment, when the language context (which is determined from a user's preference setting in one embodiment) is English, then an interpreter can repair "yet" in a text output (initial transcription from a speech recognition system) to be "yes".

In operation 307, the system executes each interpreter in the set of interpreters, in one embodiment, in order to determine whether the transcription (e.g. recognize text output 203) needs to be repaired and whether it can be repaired. In one embodiment, all interpreters in the set of interpreters are executed in operation 307. In another embodiment, only those interpreters for applications that are currently executing are executed to determine whether the transcription needs to be repaired for only those currently executing applications. In one embodiment, each interpreter decides on its own, based on its algorithms, whether it can repair one or more words in the recognized text output provided by the speech recognizer system, such as speech recognizer system in element 201 of FIG. 2. This operation is shown as FIG. 309. If none of the interpreters can repair or decide that no repair is needed then, in operation 311 the initial transcription provided by the speech recognizer system, such as recognized text output 203 is used and provided to the selected application. If, on the other hand, one or more words has been determined to be repairable, then a set of alternative interpretations is provided which includes the initial transcription (e.g. recognized text output 203) as well as repaired interpretations. For example, if it is determined that the user has no "John" in their contacts database but does have a "Jon" in their contacts database, then the word "Jon" will be an alternative interpretation of the word "John". Each interpreter maintains scores or confidence levels indicating the level of matching for one or more alternative interpretations that it can provide to, for example, a controller such as controller module 411 shown in FIG. 4. The scores or confidence levels can be used when ranking the various interpretations in order to select the highest matching interpretation. The scores or confidence levels can be determined on a per word basis or on a per phrase (e.g. two or three word) basis. Then in operation 315, a controller module or other module can perform a merging operation which, in one embodiment, attempts to merge non-overlapping interpretations based upon the confidence score or matching or ranking score provided by each interpreter. The merged interpretation which is the final transcription that has been repaired can then be provided in operation 317 to a selected application. In one embodiment, the selected application is selected based upon the command which was recognized or determined in operation 305.

FIG. 4 shows an example of an architecture which uses a set of interpreters and a controller module to repair words in an initial transcription, such as recognized text output 203. In one embodiment, each interpreter is configured or designed, through their appropriate use of algorithms, to process words in certain fields of one or more databases. For example, in the embodiment shown in FIG. 4, interpreter 401 is configured to repair words in the first name field of a contacts database 415 using algorithm A which may be, in one embodiment, an n-gram algorithm such as the algorithm shown in FIG. 8. In one embodiment, an interpreter may employ several algorithms or just one algorithm. The algorithms can include, in addition to an n-gram algorithm, a fuzzy matching algorithm which can use an edit distance which measures a similarity between two texts or can use a phonetic matching algorithm, such as a double metaphone algorithm or a soundex algorithm. In addition, a prefix, suffix partial token algorithm may be used and other algorithms known in the art for determining matches or degree of similarity between two texts can also be used. In one embodiment, different interpreters use different algorithms such that one interpreter may be use algorithm A while another interpreter uses algorithm B but not algorithm A. The algorithms are, in one embodiment, tailored to finding matches in corresponding databases and searching the databases, and in particular are tailored to the particular field each interpreter is designed to correct. Interpreter 403 can be a last name interpreter which uses algorithm A, and interpreter 405 can be a full name interpreter which uses algorithm B. Further, the set of interpreters shown in FIG. 4 can include a business name interpreter 407 which uses algorithm C which is different than algorithms B and algorithm A. Each of the interpreters 401, 403, 405, and 407 have access to contacts database 415 but not database 414 in order to search for matches in each of their corresponding fields. In addition to the use of different algorithms for the different fields, each interpreter can employ different searching algorithms when searching through their corresponding database. The set of interpreters shown in FIG. 4 also includes a media player interpreter 409 which is designed to search through one or more fields in a media database 414, such as an iTunes database of songs and/or movies, and other media, etc.

Each interpreter in the architecture shown in FIG. 4 can provide one or more alternative interpretations, such as the set of alternative interpretations 213 to the controller module 411. For example, the first name interpreter 401 may provide two different alternative interpretations of what appears to be a first name in a spoken command, and those two different interpretations will each include a scoring or ranking indicating the degree of confidence or probability that the interpretation is correct. The score or ranking is based upon the level of matching or similarity, in one embodiment. FIG. 8 shows an example of two interpretations with different scores.

FIG. 8 shows an example of how the n-gram algorithm can be used to provide scores for ranking of a matching. In this example, the text from the speech recognizer system, such as recognized text output 203, includes the word "cream" 801. This word from the speech recognizer system is then compared to at least two different words 803 and 805 found in the user's address book, and in particular word 801 is compared to words 803 and 805 as shown in FIG. 8. The algorithm provides a score by comparing pairs of letters against the text 801. As can be seen from FIG. 8, the name Kream is a closer match (as it has a score of three) than the other name found in the address book, name 805 which has a score of zero.

Figure 6:
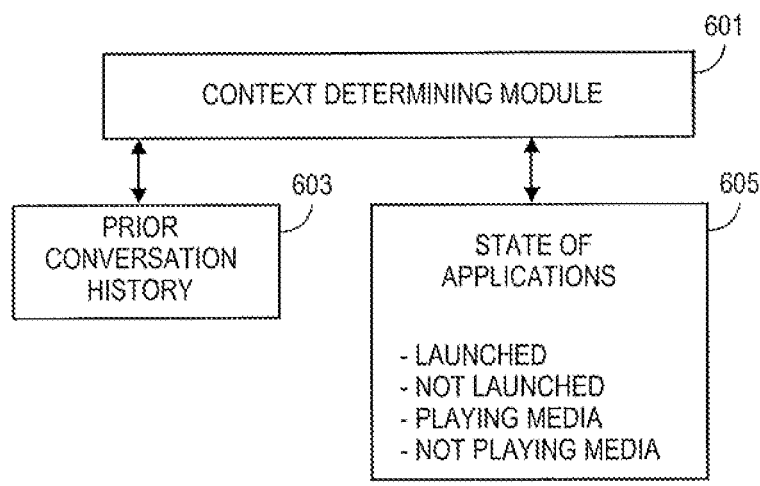
FIG. 6 shows an architecture according to one embodiment in which the current context is determined and used in a speech recognition system.

Each interpreter in the set of interpreters can use context information provided by a context determining module such as the context determining module shown in element 211 or the context determining module 601 in FIG. 6. The context can include a prior conversation history which indicates whether commands are spoken for one or more applications in the set of applications and optionally the commands themselves in addition to the words themselves. Prior conversation history 603 provides this information which can also include prior user inputs such as user inputs on a touch screen or keyboard, etc. Context determining module can determine the context from the prior conversation history and also from the state of application 605 which can include indicators indicating which applications are launched and executing, which applications are not launched, and therefore not executing, and whether media is playing, etc. For example, media player interpreter 409 can use a context indicator when media is playing to repair an initial transcription of the word "stock" to be "stop" because the user has previously caused media to start playing and in that context while the media is playing the word "stock" is interpreted to be "stop" by the media player interpreter 409. The context determining module can determine a language or locale context as described herein. The context determining module 601 can also include inputs from sensors, such as orientation sensors, or proximity sensors or light sensor, etc. as part of the context determining process. Further, the context determine module 601 can include a history of prior user inputs. The context determining module 601 collects this various information regarding context and provides it to the interpreters which use the context to help in making decisions of whether a word can be repaired in a spoken command input.

A specific implementation according to an embodiment of the present invention will now be provided in conjunction with FIG. 7. Data structure 701 represents the words in the recognized text output with tokens 703.

The process of speech recognition takes a speech audio recording and transcribes that into one or more text interpretations. The initial transcription is shown as text string 705. These transcribed texts are stored in a table-like data structure called Recognition in one embodiment and shown in FIG. 7.

A basic construct of the Recognition is a Token. A Token is an immutable string that represents an atomic unit of a transcription. If a transcription consists of a sequence of Tokens 703, then each Token is encapsulated in a second-level data structure called Phrase 707. A Phrase is a column-major data structure. An ordered list of Phrase objects forms a Recognition. The existence of a Phrase data structure is to allow for alternative transcriptions.

For example, when a user says "Call John Smith on mobile", a speech assistant application may produce the Recognition shown in FIG. 7:

The process of speech repair takes a Recognition object (shown in FIG. 7) as input and produces a modified Recognition object if any part of the original recognition requires and can be repaired.

An internal data structure called Meta-Repair can be created to assist the speech repair process. This data structure can consist of the following: the original Recognition object (shown in FIG. 7), a Repair object and Token positions relative to the original transcription.

Here is an example of Token positions look-up table for the data structure shown in FIG. 7:

Pair<Start, End>: start and end position of a specific token string relative to the original recognition text "Call John Smith on Mobile"

Meta-Repair's Token Position List:
[0]: Pair<0,3>
[1]: Pair<5,8>
[2]: Pair<10,14>
[3]: Pair<16,17>
[4]: Pair<19,24>

The Repair object of Meta-Repair consists of a list of alternative interpretations produced by the speech repair procedures. The data structure used to represent an alternative interpretation is called Repair Interpretation.

A Repair Interpretation consists of a text that is a plausible replacement for a substring in the original recognition and the start and end position that substring. For example, if "Jon" should be replacement for "John", then a Repair Interpretation for the data structure shown in FIG. 7 can be described as the following:

Repair Interpretation:
  text: "Jon"
  start: 5
  end: 8

The Meta-Repair object contains information to perform interpretation merge. The merge logic happens after the original transcription is passed, in one embodiment, through all interpreters and if there is one or more repair interpretation produced. The following pseudocode provides an example of a merge function that can be used to merge non-overlapping interpretations from the set of interpreters. The "INPUT: original:Recognition" is shown in FIG. 7.

```
FUNCTION merge
   INPUT:       original::Recognition
                repair::Repair
   OUTPUT:      original::Recognition
BEGIN
IF repair.getRepairInterpretation( ) is EMPTY
   RETURN original;
ELSE
   String originalText = repair.getOriginalText( );
   List interpretations = repair.getRepairInterpretations( );
   List ranked = rank(originalText, interpretations);
   List nonOverlap = findNonOverlapinterpretations(ranked);
   FOR each RepairInterpretation i in nonOverlap
      List<Phrase> phrases = findRepairPhrases(original, i)
      List<Token> tokens = makeRepairTokens(i);
      addTokensToPhraseHead(phrase, tokens);
   END FOR
   RETURN original;
END
FUNCTION rank
   INPUT:       originalText::String
                interpretations:: List<RepairInterpretation>
   OUTPUT:      ranked::List<RepairInterpretation>
   RETURN a sorted interpretation list using a custom Java Comparator that
          imposes a total ordering on a collection of objects.
/**
   Collections.sort(sorted, new Comparator<Repair.Interpretation>( ) {
```

```
   @Override
   public int compare(Repair.Interpretation o1,
Repair.Interpretation o2) {
      if (scoreInterpretation(o1) > scoreInterpretation(o2)) {
         return -1;
      } else if (scoreInterpretation(o1) <
scoreInterpretation(o2)) {
         return 1;
      } else {
         return 0;
      }
   }
   private float scoreInterpretation(Repair.Interpretation itp) {
      float score = 0;
      if (itp.isPerfectMatch(getOriginalText())) {
         score = getOriginalText( ).length( );
      }
      score += (float) itp.getLength( ) / getOriginalText( ).length( );
      return score;
   }
});
**/
END
```

Figure 5A:
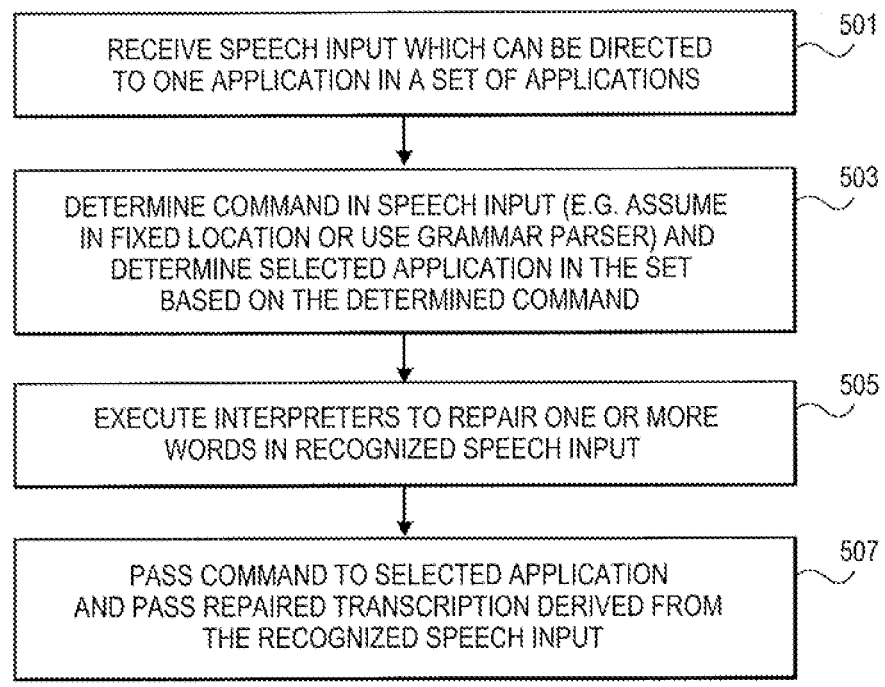
FIG. 5A shows a flowchart which depicts a method according to one embodiment of the present invention.

FIG. 5A illustrates one embodiment of the present invention which can use a speech assistant application that allows the system to select the appropriate application which is determined to be the target of the spoken command based upon the command which is detected in the spoken command. In one embodiment, the speech assistant application can use a grammar parser to detect the command in the spoken command and to thereby select the appropriate application or the user can be required to speak the command as the first word in every spoken command so that the system can determine which word is the command relative to the other words in the spoken input. In this embodiment, the system can select a particular application based upon the spoken command and thereby not require the user to select the application prior to speaking the command in order to make that application the front most application which has the speech input focus of the system. In other words, in this embodiment, the speech assistant application can select one application out of a set of applications based upon the command which is appropriate for the application. In operation 501, the system can receive a speech input which can be directed to one application in a set of applications. The applications can be executing or not executing. In one embodiment, the method can be configured so that only executing applications will be in the set of applications, but in another embodiment, all applications whether executing or not can be in the set of applications to the extent that each application can receive speech input. In operation 503, the speech assistant application can then determine the command in the speech input and can then select the proper application based upon the determined command. For example, if the command is "call", then the proper application in one embodiment is the telephone dialer to establish a telephone phone call with a person specified in the speech input (e.g. call mom at home). The command can be determined by using a grammar parser to locate the command which can be required to be a verb by instructing the user to use verbs or the system can require the user to place the command in a fixed position in the sequence of spoken words. In one embodiment, if the command is the word "tell", then the selected application is the text messaging (SMS) application; if the command is the word "play" or the word "stop", then the selected application is the media player application, etc.

Then in operation 505, the interpreters are executed to repair one or more words in the recognized speech input. If the application is selected in operation 503 prior to executing the interpreters, then only those interpreters which are designed to work with that particular application can be executed rather than executing all of the interpreters which are available in the system for all of the applications which are capable of receiving spoken commands through a speech input. Operation 505 is similar to operation 307 and can use the architecture shown in FIG. 4 in conjunction with the context determining module shown in FIG. 6. In one embodiment, the command which is determined or detected in operation 503 is not repaired. In this case, the interpreters construe the command in the text input as a stop word when performing searches through the one or more databases that the interpreters interact with. Then in operation 507, the speech assistant application can pass the command to the selected application which was determined in operation 503 and can pass the repaired transcription (which resulted from the execution of the interpreters and the merging of the alternative interpretations) to the selected application. In one embodiment, the speech assistant application can perform the passing of the commands along with the repaired transcription through an API, such as one or more APIs as shown in FIG. 5B.

Figure 5B:
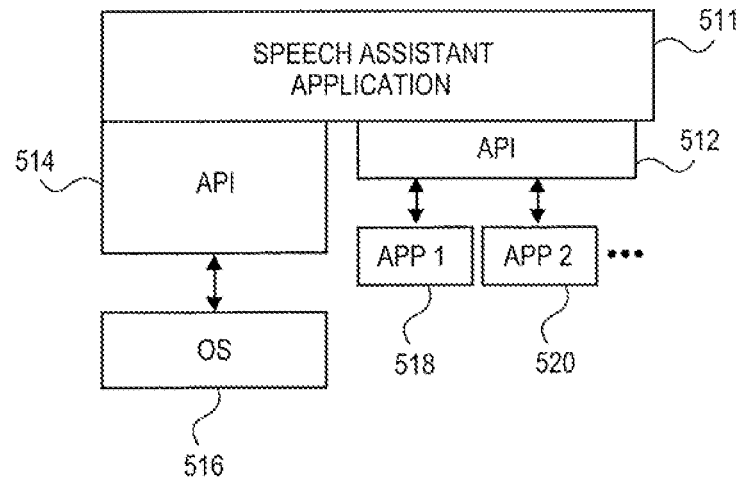
FIG. 5B shows a software architecture which includes one or more APIs which may be employed in one or more embodiments described herein.

The speech assistant application 511 shown in FIG. 5B can be the same as the speech assistant application which performs one or more methods of FIG. 5A. The speech assistant application 511 can determine a context by making a context call through API 514 to the operating system 516 which in turn returns context information, such as the context information described above and/or shown in FIG. 6. The context information can also include a list of which applications are executing and which applications previously received user inputs or previously received spoken commands. The speech assistant application 511 can also make calls to the speech recognizer system which can be a software application executing on the system shown in FIG. 5B which represents the software stack that includes the operating system 516 as well as the speech assistant application 511 and one or more applications in a set of applications, such as applications 518 and 520. The applications 518 and 520 can receive commands which are passed from the speech assistant application through the API 512.

The following are three usage examples of speech repair by a speech assistant application in one embodiment.

(1) "Snap-to-grid" voice dialing. The speech assistant application allows a user to call contacts in the address book database using speech. The user has a contact named "Marc Dickinson" in the address book, and has no contact named "Mark" or "Dick". When the user says "Call Marc Dickinson", the speech recognition incorrectly transcribes the input as "Call Mark Dick son". Instead of telling the user that the assistant cannot complete the operation because it cannot find "Mark Dick son" in the database, speech repair can exploit contact name spelling and use a fuzzy-matching algorithm to generate a more plausible alternative transcription: "Call Marc Dickinson". (2) Disambiguate user intent. The assistant speech application allows a user to send SMS messages and make voice-dialing requests. When the user says, "Tell my wife to pick up milk and fruits if she goes to Safeway after work," the assistant automatically composes a text message to the user's wife. Due to recognition errors, the speech system may incorrectly transcribe the action word "tell" as "call" or "tall". Because a request "Call my wife to pick up milk and fruits if she goes to Safeway after work" or "Tall my wife to pick up milk and fruits if she goes to Safeway after work" does not map to any actionable tasks in the assistant in one embodiment, the default response is usually "Sorry! I don't know what you meant". Speech repair can help to resolve this problem by disambiguating the speech intent using context. For example, knowing that the edit distance between the word "tell" and "tall" is short and a voice dialing command typically don't have a long running string after the target person tokens, an interpreter can rewrite the original transcription as "Tell my wife to pick up milk and fruits if she plan to visit Safeway after work". (3) Disambiguate command/system keywords. The speech system can incorrectly transcribe a short keyword pronunciation. For example, a user says "Stop" and the initial transcription is "Stock"; the user says "Yes", and the initial transcription is "Yet". Speech repair can help to overcome these problems by providing alternative transcriptions when the original transcription text is a less plausible interpretation based on one or more contextual hints. For example, when the assistant is prompting the user for a YES/NO confirmation, it is unlikely that the user would say "Yet" as a follow-up response. Instead of returning "Yet" as the final transcription, the speech repair can overwrite it with "Yes" as a more plausible speech input. Similar repair logic is applicable to the media player domain. If a user has just requested a song to be played and an immediate speech transcription is "Stock", the speech repair can rewrite it with "Stop" as a more plausible command transcription.

Figure 9:
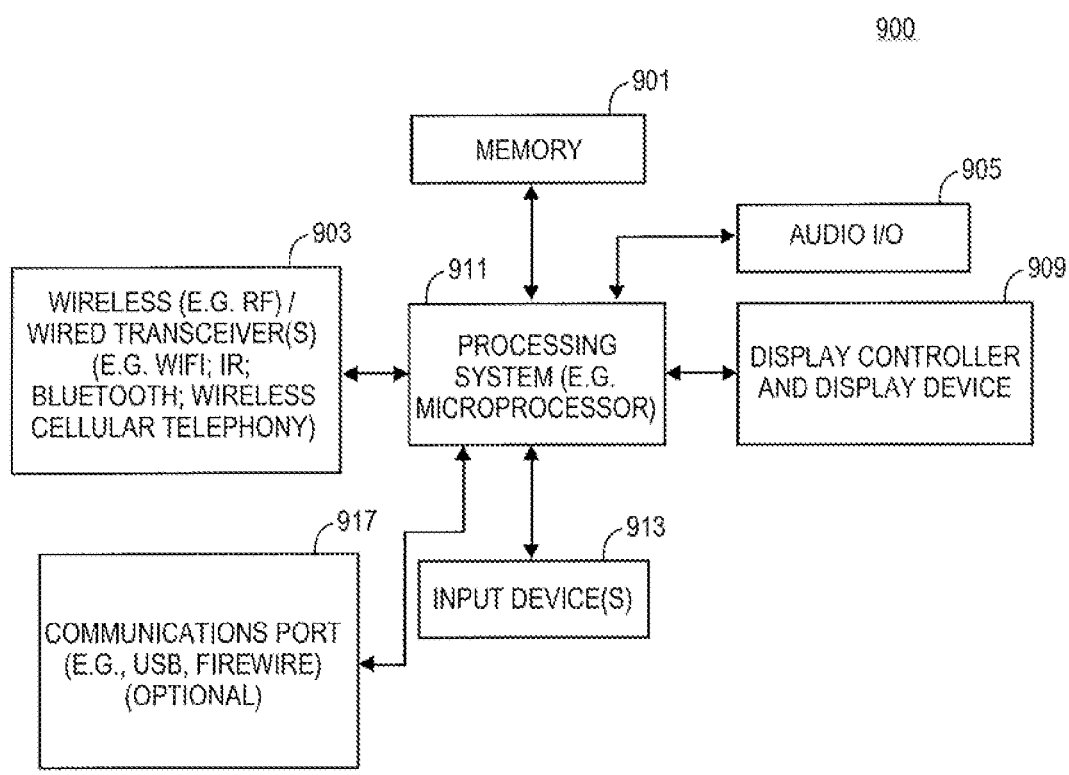
FIG. 9 shows an example of a data processing system according to one embodiment of the present invention.

FIG. 9 shows an example of data processing system 900 which may be used with one embodiment of the present invention. For example and in one embodiment, system 900 may be implemented as a portable data processing device such as a smartphone or tablet (e.g., iPad) device or a laptop or an entertainment system. The data processing system 900 shown in FIG. 9 includes a processing system 911, which may be one or more microprocessors or which may be a system on a chip (integrated circuit) and the system also includes memory 901 for storing data and programs for execution by the processing system. The memory 901 can store, for example, the software components described in conjunction with FIG. 2 and memory 901 can be any known form of a machine readable non-transitory storage medium, such as semiconductor memory (e.g., flash; DRAM; SRAM; etc.) The system 900 also includes an audio input/output subsystem 905 which may include a microphone and a speaker for, for example, playing back music or providing telephone functionality through the speaker and microphone. The microphone can receive the speech input described herein and that input can be digitized and provided to a speech recognizer system as described herein.

A display controller and display device 909 can provide a visual user interface for the user; this interface may include a graphical user interface which is similar to that shown on a Macintosh computer when running OS X operating system software or iOS software on an iPhone or iPad. The system 900 also includes one or more wireless transceivers 903 to communicate with another data processing system. A wireless transceiver may be a WLAN transceiver (e.g. WiFi), an infrared transceiver, a Bluetooth transceiver, and/or a wireless cellular telephony transceiver. It will be appreciated that additional components, not shown, may also be part of the system 900 in certain embodiments, and in certain embodiments fewer components than shown in FIG. 9 may also be used in a data processing system. The system 900 further can include one or more communications ports 917 to communicate with another data processing system. The communications port may be a USB port, Firewire port, Bluetooth interface, a docking port, etc.

The data processing system 900 also includes one or more input devices 913 which are provided to allow a user to provide input to the system. These input devices may be a keypad or a keyboard or a touch panel or a multi-touch panel which is overlaid and integrated with a display device such as display device 909. The data processing system 900 can also include an optional input/output device which may be a connector for a dock. It will be appreciated that one or more buses, not shown, may be used to interconnect the various components as is well known in the art. The data processing system shown in FIG. 9 may be a handheld computer or a personal digital assistant (PDA), or a cellular telephone with PDA-like functionality, or a handheld computer which includes a cellular telephone, or a media player, such as an iPod, or a game or entertainment device, or devices which combine aspects or functions of these devices, such as a media player combined with a PDA and a cellular telephone in one device or an embedded device or other consumer electronic devices. In other embodiments, the data processing system 900 may be a network computer or an embedded processing device within another device, or other types of data processing systems which have fewer components or perhaps more components than that shown in FIG. 9.

Data processing system 900 can optionally include one or more hardware devices designed to digitize and store human speech received by the microphone in Audio I/O 905.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

Examples of a portable media player are described in published U.S. Pat. No. 7,345,671 and U.S. published patent application number 2004/0224638, both of which are incorporated herein by reference.

One or more Application Programming Interfaces (APIs) may be used in some embodiments. An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

An API allows a developer of an API-calling component (which may be a third party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments an application or other client program may use an API provided by an Application Framework. In these embodiments the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however the API may be implemented in terms of a specific programming language. An API-calling component can, in one embodiment, call APIs from different providers such as a set of APIs from an OS provider and another set of APIs from a plug-in provider and another set of APIs from another provider (e.g. the provider of a software library) or creator of the another set of APIs.

Figure 11:
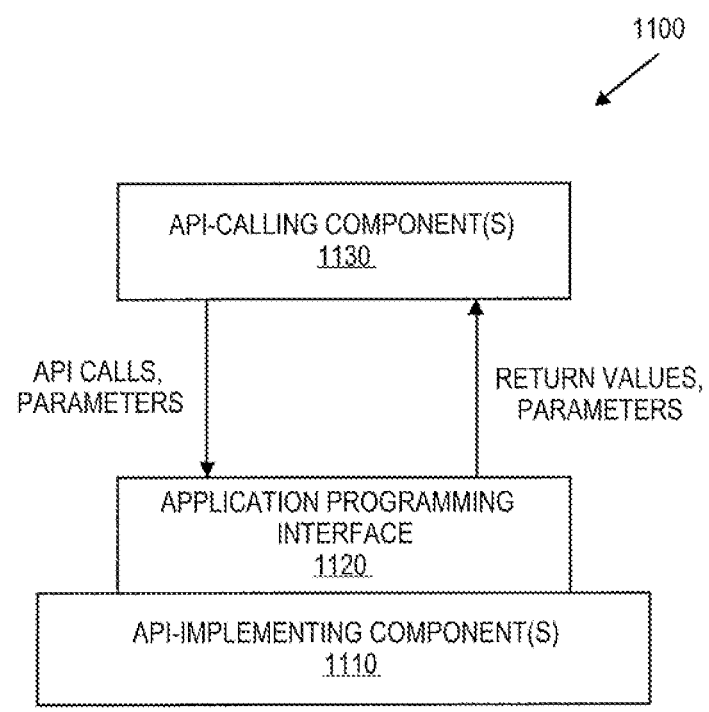
FIG. 11 is a block diagram illustrating an exemplary API architecture which may be used in some embodiments of the present invention.

FIG. 11 is a block diagram illustrating an exemplary API architecture, which may be used in some embodiments of the invention. As shown in FIG. 11, the API architecture 1100 includes the API-implementing component 1110 (e.g., an operating system, a library, a device driver, an API, an application program, software or other module) that implements the API 1120. The API 1120 specifies one or more functions, methods, classes, objects, protocols, data structures, formats and/or other features of the API-implementing component that may be used by the API-calling component 1130. The API 1120 can specify at least one calling convention that specifies how a function in the API-implementing component receives parameters from the API-calling component and how the function returns a result to the API-calling component. The API-calling component 1130 (e.g., an operating system, a library, a device driver, an API, an application program, software or other module), makes API calls through the API 1120 to access and use the features of the API-implementing component 1110 that are specified by the API 1120. The API-implementing component 1110 may return a value through the API 1120 to the API-calling component 1130 in response to an API call.

It will be appreciated that the API-implementing component 1110 may include additional functions, methods, classes, data structures, and/or other features that are not specified through the API 1120 and are not available to the API-calling component 1130. It should be understood that the API-calling component 1130 may be on the same system as the API-implementing component 1110 or may be located remotely and accesses the API-implementing component 1110 using the API 1120 over a network. While FIG. 11 illustrates a single API-calling component 1130 interacting with the API 1120, it should be understood that other API-calling components, which may be written in different languages (or the same language) than the API-calling component 1130, may use the API 1120.

The API-implementing component 1110, the API 1120, and the API-calling component 1130 may be stored in a machine-readable non-transitory storage medium, which includes any mechanism for storing information in a tangible form readable by a machine (e.g., a computer or other data processing system). For example, a machine-readable medium includes magnetic disks, optical disks, random access memory; read only memory, flash memory devices, etc. and can be a local storage medium or a storage medium on a remote device that is coupled to a client device by one or more networks.

Figure 10:
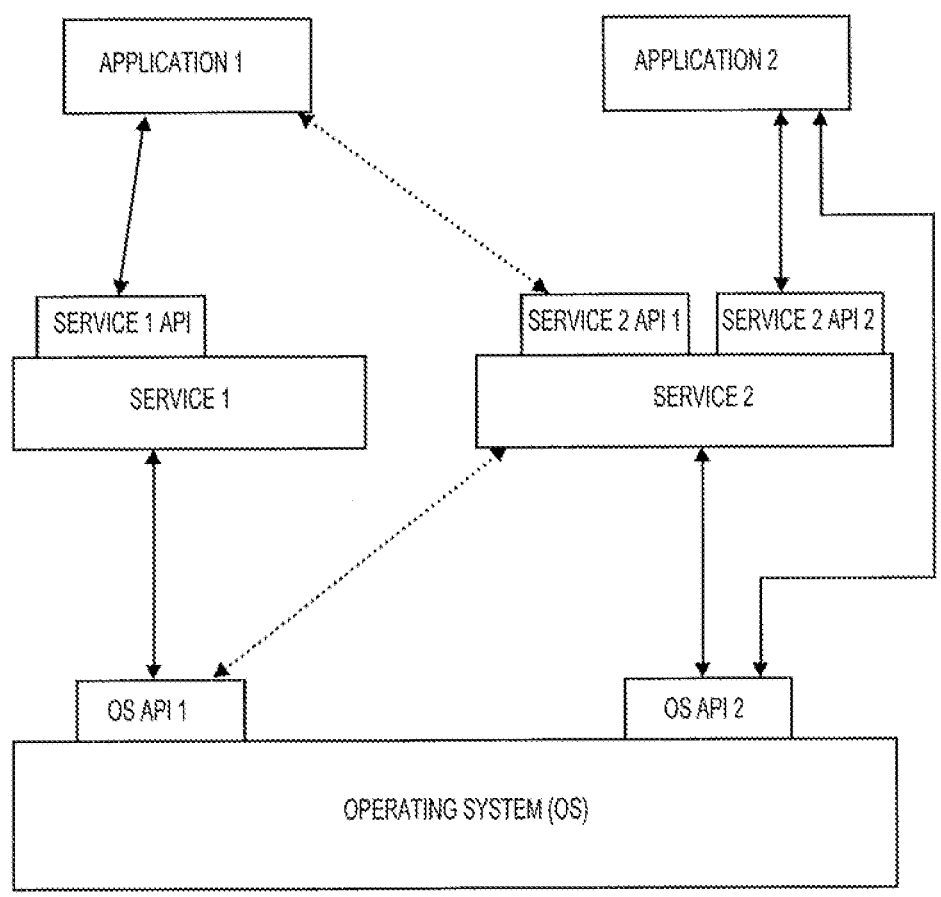
FIG. 10 is an example of a software stack which may be used in some embodiments of the present invention.

In FIG. 10 ("Software Stack"), an exemplary embodiment, applications can make calls to Services 1 or 2 using several Service APIs and to Operating System (OS) using several OS APIs. Services 1 and 2 can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for transcribing speech, the method comprising:
    at an electronic device:
        receiving a transcription of a spoken user request from a speech recognition system;
        parsing the transcription into a plurality of tokens representing words in the spoken user request;
        using a first interpreter, determining a first confidence level of a first alternative token for one of the plurality of tokens;
        using a second interpreter, determining a second confidence level of a second alternative token for the one of the plurality of tokens; and
        generating a repaired transcription by replacing the one of the plurality of tokens with the first alternative token or the second alternative token based on the first confidence level and the second confidence level.

2. The method of claim 1, wherein determining the first confidence level comprises:
    searching a database for tokens matching the one of the plurality of tokens.

3. The method of claim 2, wherein determining the first confidence level further comprises:

generating the first confidence level based on an edit distance between the one of the plurality of tokens and the first alternative token.

4. The method of claim 1, wherein determining the first confidence level comprises:
generating the first confidence level based on a context of the spoken user request.

5. The method of claim 4, wherein the context comprises a history of spoken user requests.

6. The method of claim 1, wherein the first interpreter uses a first algorithm to determine the first confidence level and the second interpreter uses a second algorithm to determine the second confidence level, wherein the first algorithm is different than the second algorithm.

7. The method of claim 1, wherein the spoken user request is transcribed using an acoustic model and a language model of the speech recognition system.

8. The method of claim 1, wherein the spoken user request comprises a command; and
wherein the method further comprises:
transmitting the repaired transcription to an application corresponding to the command.

9. A non-transitory computer-readable storage medium comprising computer-executable instructions for performing a method comprising:
receiving a transcription of a spoken user request from a speech recognition system;
parsing the transcription into a plurality of tokens representing words in the spoken user request;
using a first interpreter, determining a first confidence level of a first alternative token for one of the plurality of tokens;
using a second interpreter, determining a second confidence level of a second alternative token for the one of the plurality of tokens; and
generating a repaired transcription by replacing the one of the plurality of tokens with the first alternative token or the second alternative token based on the first confidence level and the second confidence level.

10. The computer-readable storage medium of claim 9, wherein determining the first confidence level comprises:
searching a database for tokens matching the one of the plurality of tokens.

11. The computer-readable storage medium of claim 10, wherein determining the first confidence level further comprises:
generating the first confidence level based on an edit distance between the one of the plurality of tokens and the first alternative token.

12. The computer-readable storage medium of claim 9, wherein determining the first confidence level comprises:
generating the first confidence level based on a context of the spoken user request.

13. The computer-readable storage medium of claim 12, wherein the context comprises a history of spoken user requests.

14. The computer-readable storage medium of claim 9, wherein the first interpreter uses a first algorithm to determine the first confidence level and the second interpreter uses a second algorithm to determine the second confidence level, wherein the first algorithm is different than the second algorithm.

15. The computer-readable storage medium of claim 9, wherein the spoken user request comprises a command; and
wherein the method further comprises:
transmitting the repaired transcription to an application corresponding to the command.

16. A system for transcribing speech, the system comprising:
a memory; and
a processor capable of executing a method comprising:
receiving a transcription of a spoken user request from a speech recognition system;
parsing the transcription into a plurality of tokens representing words in the spoken user request;
using a first interpreter, determining a first confidence level of a first alternative token for one of the plurality of tokens;
using a second interpreter, determining a second confidence level of a second alternative token for the one of the plurality of tokens; and
generating a repaired transcription by replacing the one of the plurality of tokens with the first alternative token or the second alternative token based on the first confidence level and the second confidence level.

17. The system of claim 16, wherein determining the first confidence level comprises:
searching a database for tokens matching the one of the plurality of tokens; and
generating the first confidence level based on an edit distance between the one of the plurality of tokens and the first alternative token.

18. The system of claim 16, wherein determining the first confidence level comprises:
generating the first confidence level based on a history of spoken user requests.

19. The system of claim 16, wherein the first interpreter uses a first algorithm to determine the first confidence level and the second interpreter uses a second algorithm to determine the second confidence level, wherein the first algorithm is different than the second algorithm.

20. The system of claim 16, wherein the spoken user request comprises a command; and
wherein the method further comprises:
transmitting the repaired transcription to an application corresponding to the command.

* * * * *